United States Patent [19]

Peterson

[11] Patent Number: 4,798,712
[45] Date of Patent: Jan. 17, 1989

[54] HOMOGENEOUS MIXTURES OF POLYPHOSPHATES

[75] Inventor: John A. Peterson, Niagara Falls, N.Y.

[73] Assignee: Occidental Chemical Corporation, Niagara Falls, N.Y.

[21] Appl. No.: 707,989

[22] Filed: Mar. 4, 1985

[51] Int. Cl.$^4$ .................... C01B 15/16; C01B 25/26
[52] U.S. Cl. .................... 423/315; 423/305; 423/312; 423/314
[58] Field of Search .............. 423/315, 305, 312, 314

[56] References Cited

U.S. PATENT DOCUMENTS 2,776,187 1/1957 Pfrengle .................. 423/315

Primary Examiner—Robert L. Stoll
Assistant Examiner—Wayne A. Langel
Attorney, Agent, or Firm—James F. Tao; William G. Gosz

[57] ABSTRACT

A homogeneous, particulate mixture of alkali metal pyrophosphates and tripolyphosphates is prepared by flash drying an aqueous solution of alkali metal orthophosphates having an alkali metal to phosphorus mole ratio in the range of 5:3 to 6:3, and calcining the resultant dried particles. Preferably, the alkali metal is sodium and the orthophosphate solution is adjusted to provide a major proportion of sodium pyrphosphate and a minor proportion of sodium tripolyphosphate in the final product.

1 Claim, No Drawings

HOMOGENEOUS MIXTURES OF POLYPHOSPHATES

BACKGROUND OF THE INVENTION

This invention relates to a process for preparing a homogeneous, particulate polyphosphate mixture from an aqueous solution of mono- and di- alkali metal orthophosphates.

Sodium polyphosphates, such as sodium pyrophosphates, sodium tripolyphosphate and sodium metaphosphate, are produced commercially from an aqueous solution of monosodium phosphate, and disodium phosphate or mixtures thereof. This "wet mix" is typically spray-dried to produce granules of the dehydrated orthophosphates, which are subsequently converted to polyphosphates by calcining the particles at elevated temperatures, e.g. 350°–550° C. The wet mix itself is typically prepared by reacting sodium carbonate and phosphoric acid in an aqueous medium.

The composition of the final polyphosphate product will depend on the sodium to phosphorus mole ratio of the wet mix. For instance, a sodium to phosphorus mole ratio of 6:3 results in the production of sodium pyrophosphate as follows:

$$2Na_2HPO_4 \rightarrow Na_4P_2O_7 + H_2O$$

Sodium tripolyphosphate is produced with a sodium to phosphorus mole ratio of 5:3 as follows:

$$2Na_2HPO_4 + NaH_2PO_4 \rightarrow Na_5P_3O_{10} + 2H_2O$$

Each polyphosphate is commercially produced as a relatively pure composition containing less than about 10% of impurities such as orthophosphates and other polyphosphates.

Occasionally, a customer will desire a mixture of two different polyphosphates, such as sodium pyrophosphate and sodium tripolyphosphate, or a mixture of different alkali metal salts of one or more polyphosphates, such as sodium and potassium pyrophosphate or a mixture of sodium and potassium tripolyphosphate and pyrophosphate. Such mixtures are typically prepared by physically blending the individual compounds. However, there are several disadvantages associated with this approach. The blending or mixing must be complete in order to insure a homogeneous mixture when the blended material is packaged in small containers. Moreover, the blending of granular compounds such as these requires close attention to particle size distributions and particle densities in order to prevent segregation of the particles upon shipment in containers or in bulk quantities. Finally, intensive blending tends to cause a breakdown of granular particles to smaller particle sizes or powders which may be undesirable.

The preparation of intimate granular mixtures of sodium tripolyphosphates and sodium sulfate is disclosed in the prior art. Both U.S. Pat. No. 3,397,948, issued Aug. 20, 1968 to Mesmer, and U.S. Pat. No. 3,684,724, issued Aug. 15, 1972 to Dyer et al, disclose mixtures of sodium sulfate and sodium tripolyphosphates. The mixtures are prepared as granular compositions from aqueous solutions of monosodium and disodium orthophosphate salts and sodium sulfate. Sodium sulfate is typically used as an extender for sodium tripolyphosphate in detergent applications.

It is, therefore, a principle object of the present invention to prepare homogeneous mixtures of alkali metal polyphosphates which are superior to the physical blends which are currently available.

SUMMARY OF THE INVENTION

In accordance with the present invention, a process is provided for preparing a homogeneous, particulate mixture of an alkali metal pyrophosphate and an alkali metal tripolyphosphate from an aqueous solution of alkali metal orthophosphates. The alkali metal to phosphorus mole ratio of the orthophosphate solution is in-the range of from 5:3 to 6:3 and is adjusted to provide the desired proportion of each polyphosphate in the final product. The preferred alkali metals include both sodium and potassium.

DETAILED DESCRIPTION OF THE INVENTION

The process of the present invention involves, in general terms, the steps of (1) forming an aqueous solution of alkali metal orthophosphates having an alkali metal to phosphorous mole ratio in the range of from 5:3 to 6:3, (2) flash-drying the solution at a temperature of from about 150° C. to about 250° C. to form phosphate particles, (3) calcining the dried particles at a temperature of from about 350° C. to about 550° C. to convert the particles into polyphosphate particles, and (4) recovering polyphosphate particles of the desired fineness.

The alkali metal orthophosphate solution of the present invention is a concentrated solution (50% or higher solids content) of mono- and/or di- alkali metal orthophosphates. The alkali metal to phosphorus mole ratio of this solution is adjusted to between 5:3 and 6:3 to provide the appropriate mixture of pyrophosphate and tripolyphosphate in the final product. Either a single alkali metal or a mixture of alkali metals can be advantageously employed in this invention. The preferred alkali metals are sodium and potassium.

The composition of the particles is determined by the alkali metal to phosphorus mole ratio, with higher mole ratios resulting in relatively greater concentrations of pyrophosphate and lesser concentrations of tripolyphosphate. The alkali metal to phosphorus mole ratio is adjusted to provide a minimum concentration of each polyphosphate in the final product of about 15% by weight. When sodium is the alkali metal of choice, a particularly advantageous polyphosphate composition is one which contains at least about 75% by weight of sodium pyrophosphate and less than about 25% by weight of sodium tripolyphosphate.

The wet mix solution of sodium orthophosphates is prepared by neutralizing phosphoric acid with sodium carbonate. The final adjustment of the sodium to phosphorus mole ratio is achieved by the addition of sodium hydroxide to the solution. Substitution of potassium hydroxide for sodium hydroxide or part of the sodium carbonate results in the addition of potassium ions to the solution and the production of mixed alkali metal polyphosphate compositions. The ratio of alkali metal ions in the solution determines the relative proportion of each alkali metal polyphosphate in the final product. For instance, a mixture of 20% potassium pyrophosphate and 80% sodium pyrophosphate results from a potassium to sodium mole ratio of 1:4 and a total alkali to phosphorus mole ratio of 6:3 in the starting solution. The preparation of homogeneous compositions having varying amounts of different alkali metals and polyphosphates can be achieved by adjusting each of these parameters as will be readily understood by those skilled in the art.

The alkali metal orthophosphate solution is flash-dried to prepare a homogeneous, particulate phosphate mixture. Flash-drying can be accomplished using a variety of process equipment such as a drum drier or a spray drier. Slow evaporation of the water from the solution is to be avoided, however, since this would cause selective crystallization of the solution components, yielding a heterogeneous mixture of solids. The drying temperature should be maintained in the range of from about 150° C. to about 250° C. to insure rapid removal of water.

The dried phosphate particles are subsequently calcined at a temperature in the range of from about 350° C. to about 550° C. to convert the orthophosphates into polyphosphates. The conversion takes place in the solid state and produces granular particles having a homogeneous polyphosphate composition. The calcining should be conducted at a temperature which is sufficiently high to molecularly dehydrate the acid orthophosphates. Lower temperatures than specified herein should be avoided since this can result in the presence of unconverted acid orthophosphates in the final product, depending on the temperature and retention time. Partial conversion of orthophosphates to polyphosphates will produce complex, but homogeneous, mixtures having a composition controlled by the reaction conditions. Mixtures of pyrophosphates and tri-alkali metal orthophosphates can be made by starting with a wet mix having an alkali metal to phosphorus mole ratio of 6:3 to 9:3, and calcining the particles in the preferred temperature range. Similarly, mixtures of metaphosphates and tripolyphosphates can be made from wet mix solutions having an alkali metal to phosphorus mole ratio of 3:3 to 5:3.

Finally, granular polyphosphate particles having the desired fineness are recovered. This can be accomplished by screening and/or milling the product in accordance with known techniques.

The following examples further illustrate the various aspects of the invention but are not intended to limit it. Various modifications can be made in the invention without departing from the spirit and scope thereof, and will be readily appreciated by those skilled in the art. Such modifications and variations are within the purview and scope of the appended claims.

EXAMPLE 1

A solution of sodium orthophosphates having a solids content of 50%, was made by neutralizing phosphoric acid with sodium carbonate. After final adjustment with sodium hydroxide, the sodium to phosphorus mole ratio was 5.76:3 moles. The solution was spray dried to yield a solid intermediate at about 200° C. final temperature. The intermediate was calcined in a rotary furnace to a final temperature of 450° to 500° C. The granular homogeneous pyrophosphate, tripolyosphate mixture was milled to a fine powder containing 77.0% (wt) of sodium pyrophosphate and 22.5% (wt) of sodium tripolyphosphate, assaying 54.1% total $P_2O_5$ content.

EXAMPLE 2

A solution of sodium and potassium orthophosphates was made up by neutralizing phosphoric acid with sodium carbonate and potassium hydroxide, so that potassium to sodium mole ratio was 1:4 moles and the sodium+potassium to phosphorus mole ratio was 6:3 moles. This solution was spray dried at about 200° C. and the solid intermediate was calcined at 400° to 500° C. The final product was a homogeneous mixture of pyrophosphates containing 75.9% sodium pyrophosphate and 23.6% potassium pyrophosphate.

What is claimed is:

1. A process for preparing a homogenous, particulate mixture of sodium pyrophosphate and sodium tripolyphosphate, said process consisting essentially of the steps of:
  (a) forming an aqueous solution of monosodium phosphate and disodium phosphate having a sodium to phosphorus mole ratio in the range of from 5:3 to 6:3,
  (b) flash drying the solution at a temperature in the range of from about 150° C. to about 250° C. to form phosphate particles,
  (c) calcining the dried particles at a temperature of from about 350° C. to about 550° C. to convert monosodium phosphate and disodium phosphate particles into homogenous polyphosphate particles, and
  (d) recovering said homogenous polyphosphate particles, said particles containing from about 75% to about 85% by weight of sodium pyrophosphate and from about 15% to about 25% by weight of sodium tripolyphosphate.

* * * * *